US012280672B2

United States Patent
Bangalore Srinivas et al.

(10) Patent No.: US 12,280,672 B2
(45) Date of Patent: Apr. 22, 2025

(54) AUTONOMOUS MOBILE ROBOT FOR OUTDOOR APPLICATIONS

(71) Applicant: Tata Consultancy Services Limited, Mumbai (IN)

(72) Inventors: Venkatesh Prasad Bangalore Srinivas, Bangalore (IN); Venkat Raju Chintalapalli Patta, Bangalore (IN); Pradeep Prabhakar Kamble, Bangalore (IN); Rajasilpi Sureshkumar Presannakumari, Bangalore (IN); Kaushik Das, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 557 days.

(21) Appl. No.: 17/122,170

(22) Filed: Dec. 15, 2020

(65) Prior Publication Data

US 2021/0237554 A1    Aug. 5, 2021

(30) Foreign Application Priority Data

Feb. 5, 2020    (IN) .............................. 202021005055

(51) Int. Cl.
*B60K 7/00*    (2006.01)
*B60G 11/14*    (2006.01)
(Continued)

(52) U.S. Cl.
CPC ............ *B60K 7/0007* (2013.01); *B60G 11/14* (2013.01); *B60K 17/043* (2013.01); *B25J 5/007* (2013.01); *G05D 1/0088* (2013.01)

(58) Field of Classification Search
CPC .... B60K 7/0007; B60K 17/043; B60G 11/14; B25J 5/007; G05D 1/0088
(Continued)

(56) References Cited

U.S. PATENT DOCUMENTS 8,919,801 B2 * 12/2014 Toebes ................... B65G 13/00
280/400
9,156,394 B2    10/2015 Toebes et al.
(Continued)

FOREIGN PATENT DOCUMENTS

CN    101295539 A    10/2008
CN    105835945 A *   8/2016  ............... B62D 3/12
(Continued)

OTHER PUBLICATIONS

A.R. Ismail, All About Oil Seals, Sep. 3, 2018, Bearing Centre, p. 1, Paragraphs 1-2 (Year: 2018).*
(Continued)

*Primary Examiner* — Hung Q Nguyen
*Assistant Examiner* — Anthony Donald Taylor, Jr.
(74) *Attorney, Agent, or Firm* — FINNEGAN, HENDERSON, FARABOW, GARRETT & DUNNER LLP

(57) ABSTRACT

An autonomous mobile robot (AMR) for a plurality of outdoor applications is provided. The AMR includes a base frame configured to obtain the configurable base frame based on one or more parameters; a first drive wheel sub assembly, and a second drive wheel assembly is additionally re-oriented oppositely to the first drive wheel assembly to form a drive wheel assembly; a plurality of suspension units is configured by the one or more side plates of the configurable base frame and a plurality of gearboxes; and the plurality of gearboxes is configured to as a plurality of configurable gearboxes for obtaining different drive power of the drive wheel assembly by at least changing one of one or more dimensions of a plurality of gearbox plates, one or more ratio of a wheel shaft gear and a motor gear shaft, and one or more specification associated with a plurality of drive motors.

15 Claims, 16 Drawing Sheets

(51) Int. Cl.
*B60K 17/04* (2006.01)
*B25J 5/00* (2006.01)
*G05D 1/00* (2006.01)

(58) Field of Classification Search
USPC .......................................................... 180/233
See application file for complete search history.

(56) References Cited

U.S. PATENT DOCUMENTS

| | | | | |
|---|---|---|---|---|
| 2005/0045392 | A1* | 3/2005 | Maslov | H02K 16/04 |
| | | | | 180/65.51 |
| 2010/0312390 | A1* | 12/2010 | Dupourque | B25J 5/007 |
| | | | | 901/1 |
| 2013/0011234 | A1* | 1/2013 | Pretlove | B25J 5/005 |
| | | | | 701/2 |
| 2018/0072212 | A1* | 3/2018 | Alfaro | B60P 1/48 |
| 2019/0189981 | A1* | 6/2019 | Neumann | H01M 50/296 |
| 2021/0232989 | A1* | 7/2021 | Rana | G05B 19/41895 |

FOREIGN PATENT DOCUMENTS

| | | | | | |
|---|---|---|---|---|---|
| CN | 107310657 | A | * | 11/2017 | B60G 3/04 |
| CN | 107323194 | A | * | 11/2017 | B60G 11/00 |
| CN | 110239336 | A | * | 9/2019 | B25J 5/007 |

OTHER PUBLICATIONS

Champeny-Bares, Lee et al., "The Terregator Mobile Robot," May 1991, p. 45, Publisher: Carnegie Mellon University, Link: https://www.ri.cmu.edu/pub_files/pub1/champeny_bares_1991_1/champeny_bares_1991_1.pdf.

* cited by examiner

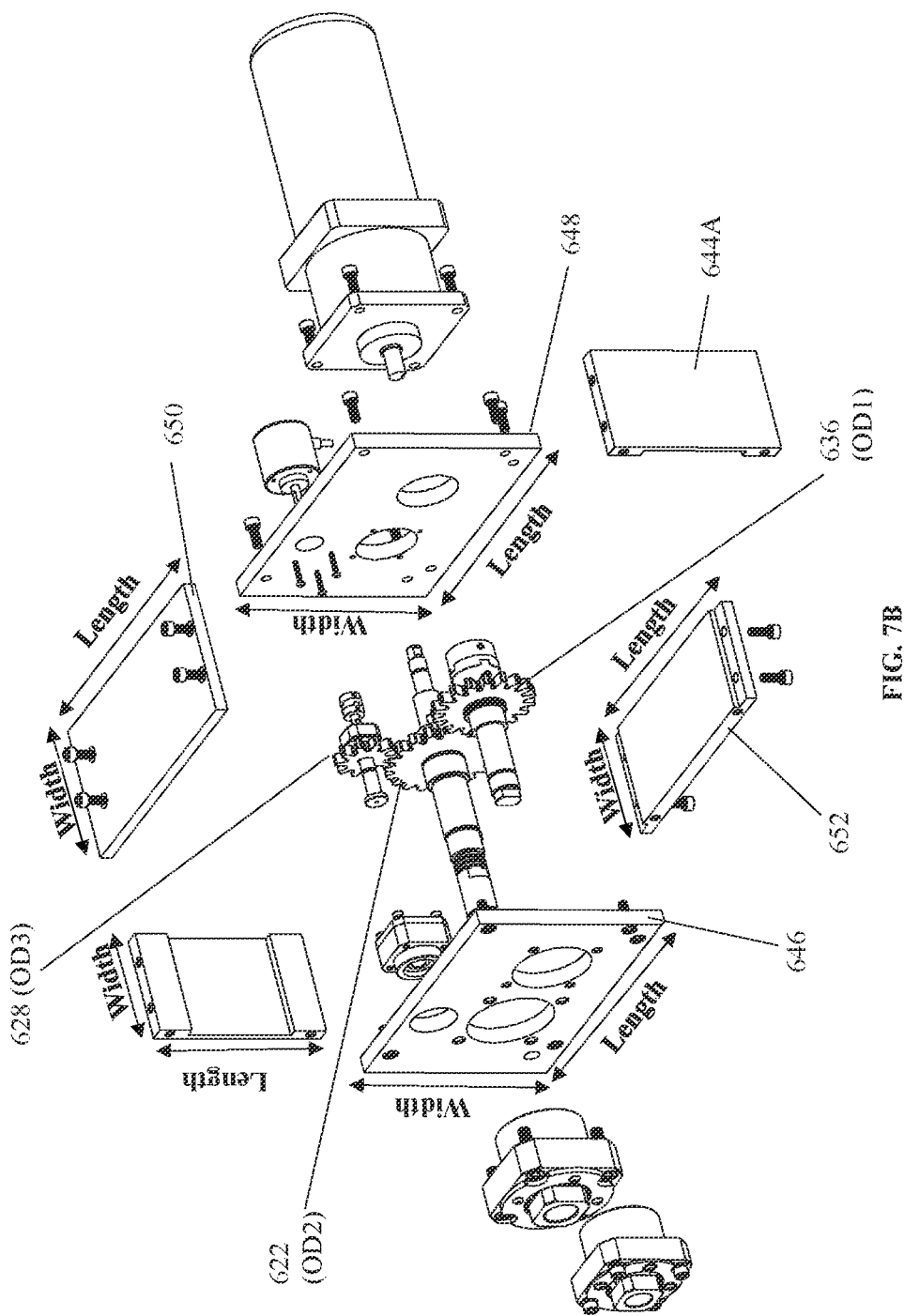

AUTONOMOUS MOBILE ROBOT FOR OUTDOOR APPLICATIONS

PRIORITY CLAIM

This U.S. patent application claims priority under 35 U.S.C. § 119 to: India application No. 202021005055, filed on Feb. 5, 2020. The entire contents of the aforementioned application are incorporated herein by reference.

TECHNICAL FIELD

This disclosure relates generally to robotic vehicles, and, more particularly, to autonomous mobile robot for one or more outdoor applications.

BACKGROUND

Mobile robotics is a relatively new and maturing field which is progressing rapidly due to advantages it provides in terms of faster Return on Investment (ROI) and ease of implementation even in brown field applications. Effectiveness of robots can be enhanced by introduction of a mobile platform to perform applications like picking, cutting operations, assembly, machine tending. Autonomous mobile robots, often referred to as AMRs, are usually unmanned vehicles which came into existence as an outcome of mobile robotic research. A fixed manipulator can do a variety of jobs with speed and precision. Flexibility of operation can be proliferated by availing a variety of end effectors according to genre of application to be performed. Still, a manipulator possesses a crucial downside, which is lack of mobility. The range of motion is constrained to linear and angular displacements of the robotics arms. This downside is solved in the art by providing mobility to the manipulator by the help of a base platform.

The mobile manipulators are mostly developed for industrial working conditions. Considering, exterior industry space terrains are rougher and uneven compared to indoor industrial workspaces with respect to flexibility and mobility. The mobile manipulators are not a built as a compact system to utilize for indoor and exterior industry space terrains. The autonomous mobile robots are designed to perform robotic applications with mobility. Most of the AMR's available are developed for industrial conditions. The main load carrying member of the AMR is a chassis which takes all load coming to the vehicle and transfer to wheels. For all wheel drive vehicles gearbox in general consumes considerable space and would increase length, width or height of the vehicle.

SUMMARY

Embodiments of the present disclosure present technological improvements as solutions to one or more of the above-mentioned technical problems recognized by the inventors in conventional systems. For example, in one embodiment, an autonomous mobile robot (AMR) for a plurality of outdoor applications is provided. The autonomous mobile robot (AMR) includes (i) a base frame being configured to obtain the configurable base frame based on one or more parameters; (ii) a first drive wheel sub assembly, and a second drive wheel assembly is additionally re-oriented oppositely to the first drive wheel assembly to form a drive wheel assembly; (iii) a plurality of suspension units is configured by the one or more side plates of the configurable base frame and a plurality of gearboxes to provide an independent suspension to the AMR; and (iv) the plurality of gearboxes is configured to as a plurality of configurable gearboxes for obtaining different drive power of the drive wheel assembly by changing at least one of (i) one or more dimensions of a plurality of gearbox plates, (ii) one or more ratio of a wheel shaft gear and a motor gear shaft, and (iii) one or more specification associated with a plurality of drive motors. In an embodiment, the one or more parameters corresponds to one or more dimensions associated with the AMR to perform corresponding one or more applications. In an embodiment, the configurable base frame is enveloped with one or more side plates, a rear plate, one or more corner plates, and a front plate. In an embodiment, the second drive wheel assembly is identical to the first drive wheel assembly.

In an embodiment, the configurable base frame may be bolted for assemble and dismantle to attain varieties of dimensions of a platform for corresponding plurality of applications. In an embodiment, a length and a width of the AMR may correspond to a wheel track and a wheel base respectively for one or more payload characteristics, and one or more working environmental maneuverability parameters. In an embodiment, a flange may be designed on the rear plate of the configurable base frame to provide a space for mounting a robot/cobot. In an embodiment, a force from the robot/cobot may be directly transmitted to the configurable base frame for minimizing deflections. In an embodiment, the front plate and the rear plate may be bolted in between the drive wheel assembly to form the configurable base frame. In an embodiment, the one or more corner plates may be connecting the one or more side plates and the front plate and the rear plate to fill gap for avoiding one or more external particles entering the AMR. In an embodiment, the plurality of gearbox plates may include a side plate, a front plate, a rear plate, a top plate, a bottom plate. In an embodiment, change in the one or more dimensions for at least one of gearbox outer plate may result in change in at least one dimension: (i) length, and (ii) width of the front plate of the gearbox. In an embodiment, the plurality of gearboxes and the drive wheel assembly may be configured to lift upward or downward to keep the plurality of drive wheels touching a floor to provide enough traction to drive the AMR irrespective of spring compression of the plurality of suspension units.

In an embodiment, the top plate of the gearbox and the bottom plate of the gearbox may be provided with plurality of clearance holes and remaining plates are provided with plurality of threaded holes through which plurality of fasteners are screwed to form the plurality of gearboxes. In an embodiment, the configurable base frame may distribute and transmit load from a top plate to one or more drive wheels. In an embodiment, the one or more side plates may be assembled with a plurality of drive motors, the plurality of gearboxes, and the plurality of drive wheels to form the first drive wheel sub assembly and the second drive wheel assembly. In an embodiment, the plurality of suspension units may include a plurality of linear bearings with a plurality of springs, a plurality of spring housings, and a suspension stroke restrictor to independently enable up and down movement to accommodate variability of a ground surface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 7B is an exploded view of plurality of configurable components of the gearbox illustrated in FIG. 6B of the autonomous mobile robot (AMR), according to some embodiments of the present disclosure.

DETAILED DESCRIPTION

Figure 1A:
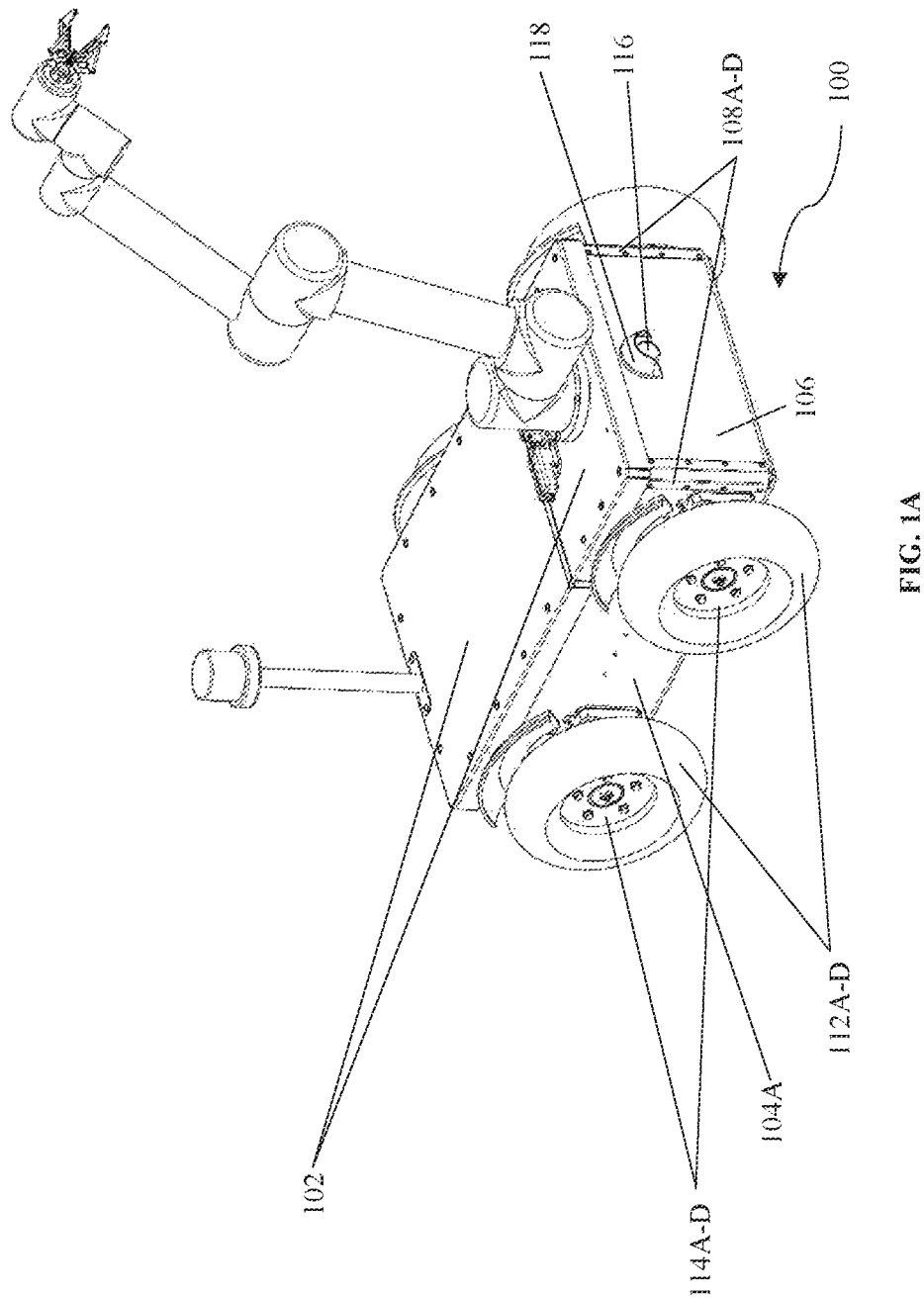
FIG. 1A and FIG. 1B are isometric views illustrating a front portion and a rear portion of an autonomous mobile robot (AMR) for one or more outdoor applications, according to embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Outdoor AMRs must work in irregular terrains and need suspension. The outdoor AMRs for (e.g., non-industrial) use may have independent pivoted suspension which would need more physical space. Whereas in industrial usage, the terrain in outside of factory will be better as compared to an outside factory terrain. A simpler space saving design of dual linear spring small stroke suspension will suffice for outside factory terrain. In such cases for e.g., an all-terrain vehicle (ATV) like autonomous vehicle requires a large stroke suspension for huge variations in floor conditions. Typically, there is a need to consider one or more parameters associated with the AMR such as payload, size (e.g., a wheel base, a wheel track, a length and a width of the vehicle), and weight of the AMR. Further, there is a need to redesign the AMR based on the new values of the above mentioned one or more parameters.

The embodiments of the present disclosure provide an autonomous mobile robot (AMR) that is configured to operate with a vision system and an optional robotic arm mounted on top. The AMR dynamically learn about environment and updates learning every time based on navigation of the AMR and works in collaborative environment without any human intervention. The AMR avoids both static obstacles and dynamic obstacles, hurdles etc. A configurable base frame disclosed in the present disclosure support to achieve in reducing the significant amount of time lost during design and manufacturing of the new AMR. The configurable base frame is a box like structure which is enveloped using a top plate and a bottom plate. Here the name configurable means according to dimensional specification of the required AMR, relevant components/subsystems can be chosen to be assembled together. The configurable base frame design leverages the usage of the one or more tools (e.g. a product life cycle management tool (PLM) and 3D CAD tool) and also considering one or more parametric approaches but not limited to provide automation by generating at least one of: (i) one or more component design and associated component drawings, (ii) assembly design and associated assembly drawings, (iii) manufacturing process drawings, (iv) manufacturing programs. A plurality of drive assembly with the base frame constitute the AMR. The autonomous mobile robot (AMR) system utilizes an independent drive for one or more wheels with a drive motor to move the AMR. The working principle is a skid steer mechanism.

Referring now to the drawings, and more particularly to FIGS. 1 through 11, where similar reference characters denote corresponding features consistently throughout the figures, there are shown preferred embodiments and these embodiments are described in the context of the following exemplary system and/or method.

Reference numerals of one or more components of an autonomous mobile robot (AMR) as depicted in the FIGS. 1 through 11 are provided in Table 1 below for ease of description.

TABLE 1

| S. NO | NAME OF COMPONENT | REFERENCE NUMERALS |
|---|---|---|
| 1 | Autonomous mobile robot (AMR) | 100 |
| 2 | Top plate | 102 |
| 3 | Side plates | 104A-B |
| 4 | Rear plate | 106 |

TABLE 1-continued

| S. NO | NAME OF COMPONENT | REFERENCE NUMERALS |
|---|---|---|
| 5 | Corner plates | 108A-D |
| 6 | Front plate | 110 |
| 7 | Plurality of drive wheels | 112A-D |
| 8 | Plurality of Rim | 114A-D |
| 9 | ON/OFF switch | 116 |
| 10 | Switch protecting cover | 118 |
| 11 | Plurality of emergency switches | 120A-B |
| 12 | Plurality of mud guards | 122A-D |
| 13 | Sensor | 124 |
| 14 | Robot/cobot | 126 |
| 15 | End effector | 128 |
| 16 | Plurality of standoffs | 202A-D |
| 17 | Battery | 204 |
| 18 | Battery holding plate | 206 |
| 19 | Plurality of Springs | 208A-B |
| 20 | Plurality of suspension units | 210A-N |
| 21 | Hole for robot/cobot mounting | 212 |
| 22 | Structural tubing | 214 |
| 23 | First drive wheel sub assembly | 302A |
| 24 | Second drive wheel sub assembly | 302B |
| 25 | Drive wheel assembly | 304 |
| 26 | Plurality of drive wheel shafts | 306A-D |
| 27 | Plurality of gearboxes | 308A-D |
| 28 | Plurality of drive motors | 310A-D |
| 29 | Bottom plate | 402 |
| 30 | Louvers | 404 |
| 31 | Wheel base | 406 |
| 32 | Wheel track | 408 |
| 33 | Configurable base frame | 500 |
| 34 | Cutouts to mount the gearbox | 502 |
| 35 | Cutout for Power switch and charging port | 504 |
| 36 | Holes to mount robot/cobot | 506 |
| 37 | Holes to mount the suspension unit | 508A-N |
| 38 | Flange | 510 |
| 39 | Bearing unit for drive wheel shaft | 602 |
| 40 | Bearing unit for drive motor | 604 |
| 41 | Oil seal | 606 |
| 42 | Lock nut | 608 |
| 43 | Tightener | 610 |
| 44 | Ball Bearing | 612 |
| 45 | Bearing cover | 614 |
| 46 | Spacer | 616 |
| 47 | Shaft Spacer | 618 |
| 48 | Linear bearing | 620 |
| 49 | Wheel shaft gear | 622 |
| 50 | Configured wheel shaft gear | 622' |
| 51 | Drive motor gear | 624 |
| 52 | Configured Drive motor gear | 624' |
| 53 | Encoder | 626 |
| 54 | Encoder shaft gear | 628 |
| 55 | Configured Encoder shaft gear | 628' |
| 56 | Encoder shaft | 630 |
| 57 | Suspension Stroke restrictor | 632 |
| 58 | Flexible coupling | 634 |
| 59 | Motor gear shaft | 636 |
| 60 | Additional Bearing unit for Drive Wheel shaft | 638 |
| 61 | Step features | 640 |
| 62 | Bearing unit for encoder shaft | 642 |
| 63 | Side plate of the Gearbox | 644A-B |
| 64 | Front plate of the gearbox | 646 |
| 65 | Rear plate of the gearbox | 648 |
| 66 | Top plate of the gearbox | 650 |
| 67 | Bottom plate of the gearbox | 652 |
| 68 | Configured Side plate of the Gearbox | 644A'-B' |
| 69 | Configured Front plate of the gearbox | 646' |
| 70 | Configured Rear plate of the gearbox | 648' |
| 71 | Configured Top plate of the gearbox | 650' |
| 72 | Configured Bottom plate of the gearbox | 652' |
| 73 | Spring housing | 1002 |
| 74 | Screw | 1004 |

Figure 1B:
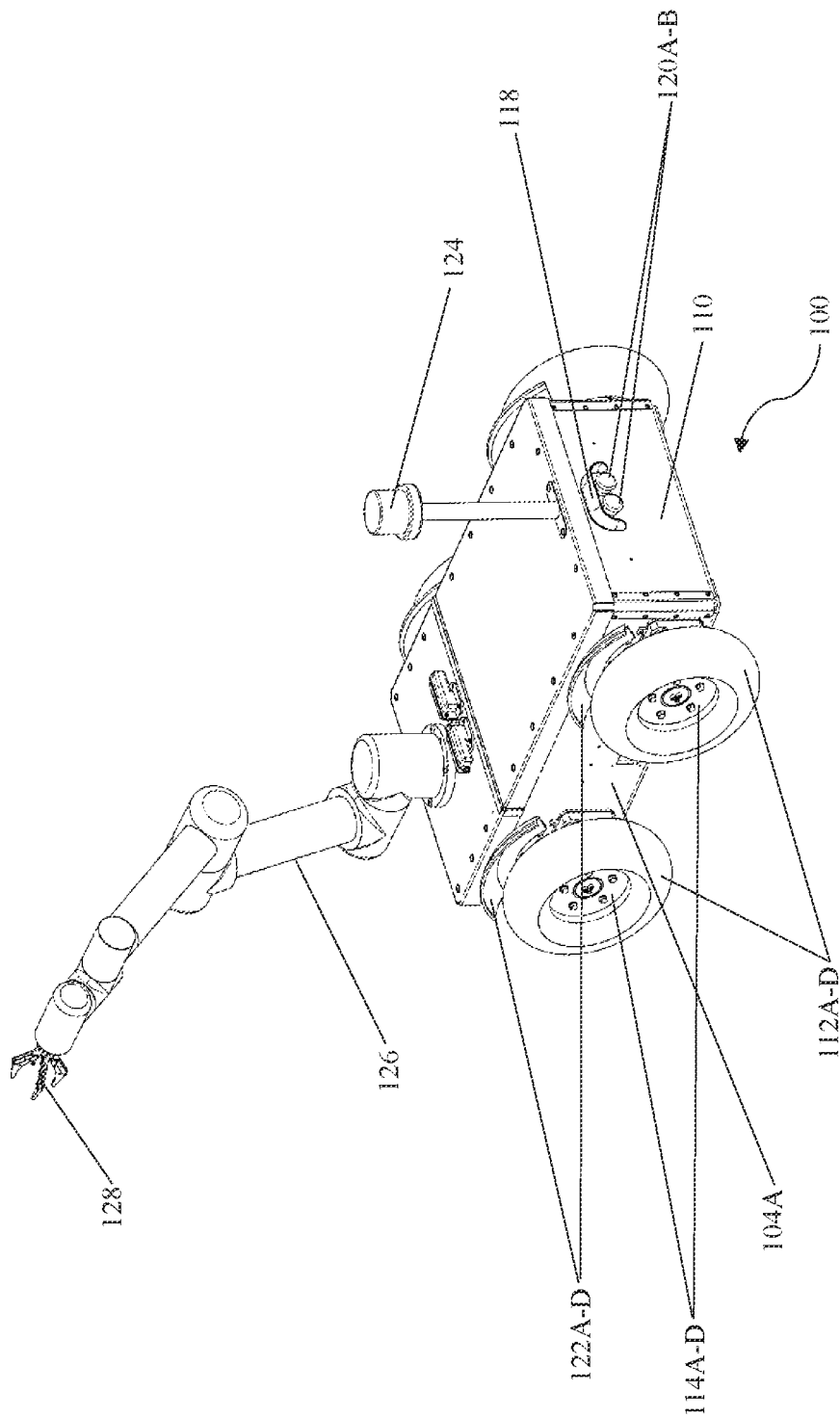
Figure 2:
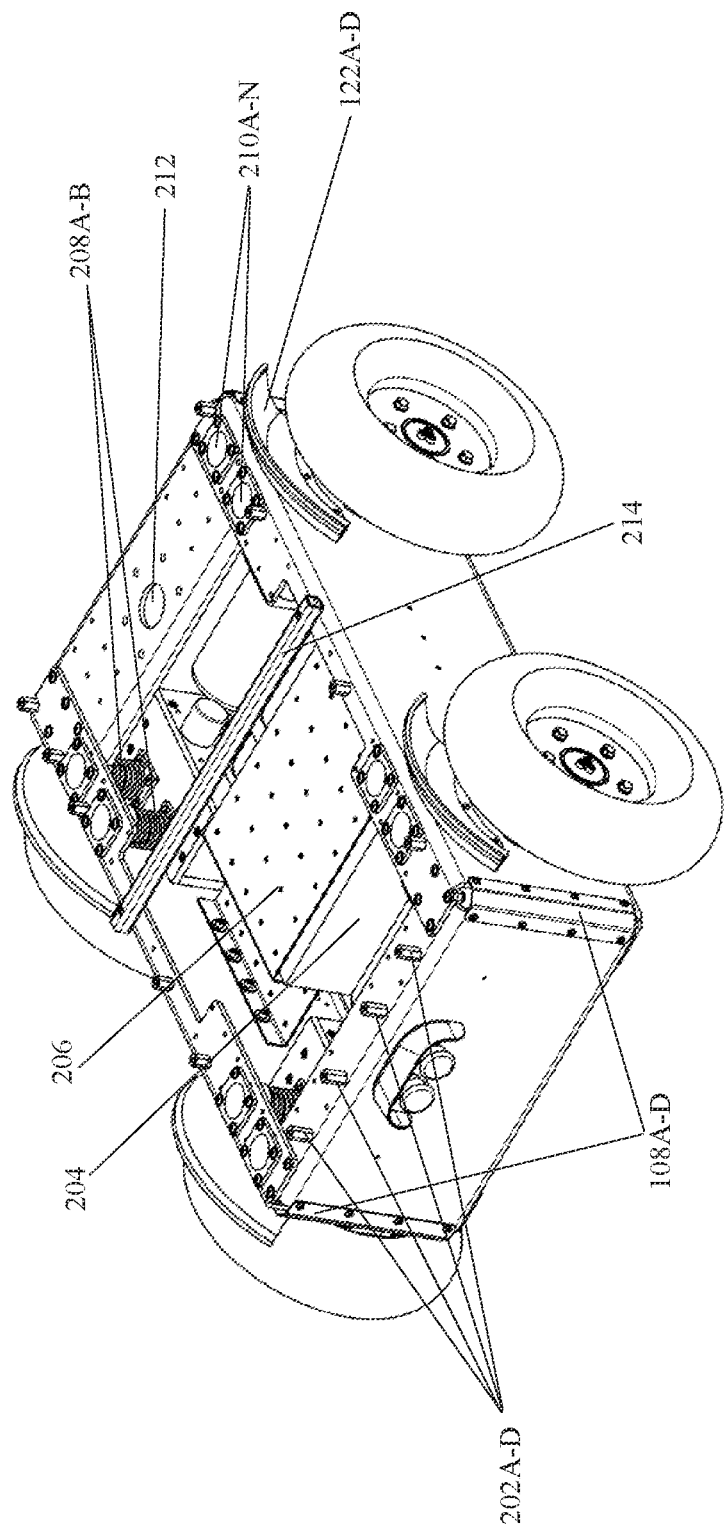
FIG. 2 illustrate an isometric view showing one or more inner components of the autonomous mobile robot (AMR), according to some embodiments of the present disclosure.
Figure 3B:
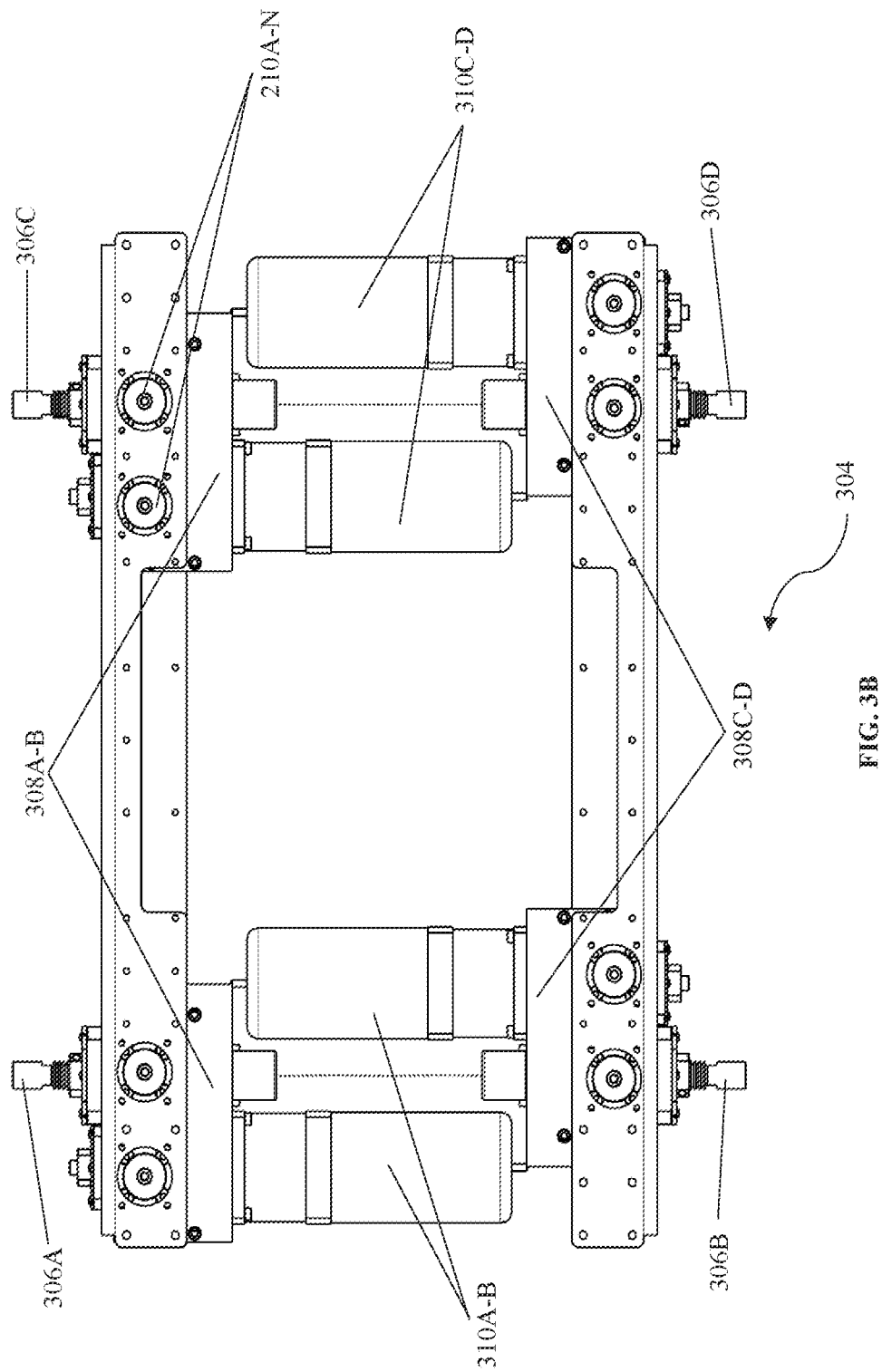
FIG. 3B is a top view of the drive wheel assembly of the autonomous mobile robot (AMR), according to some embodiments of the present disclosure.
Figure 4:
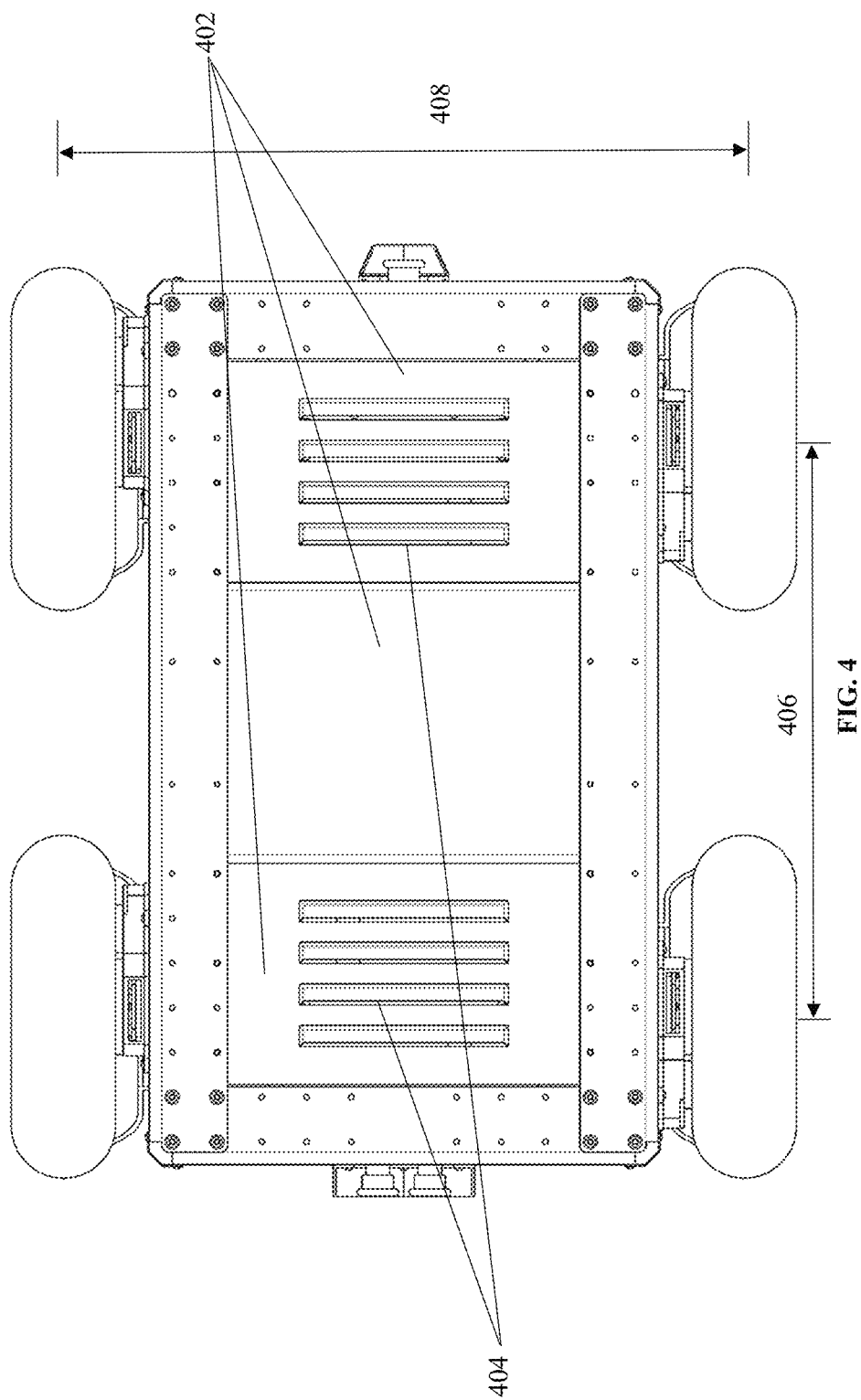
FIG. 4 is a bottom view of the autonomous mobile robot (AMR), according to some embodiments of the present disclosure.
Figure 5A:
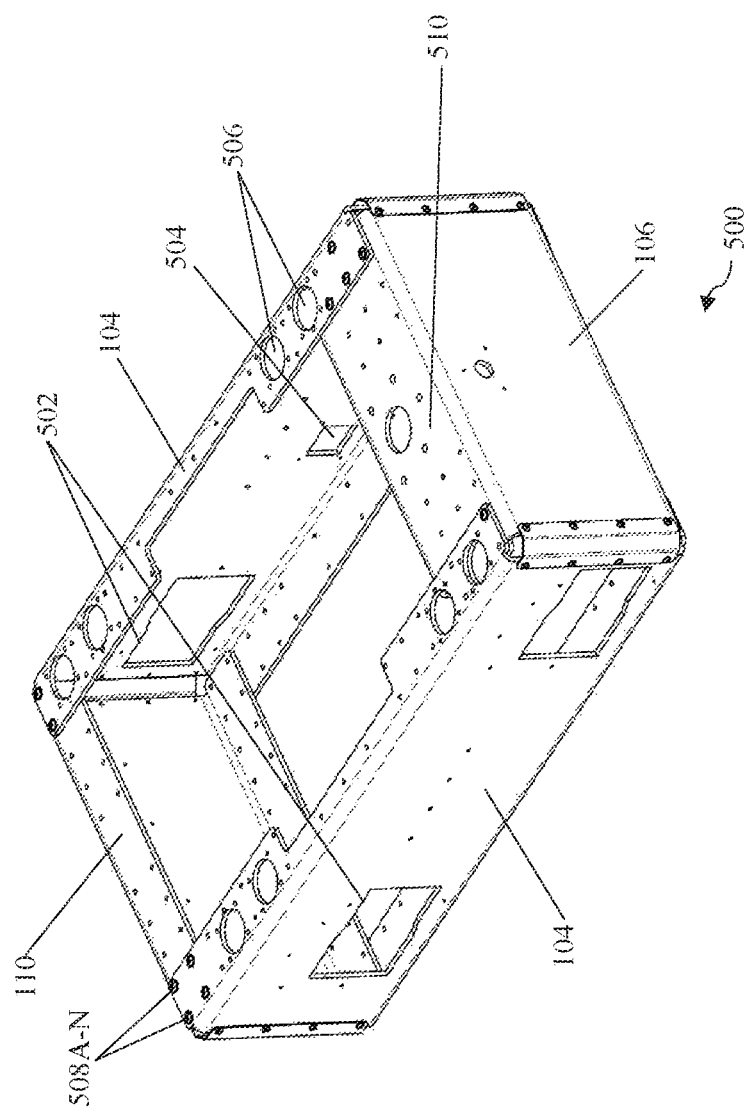
FIGS. 5A and 5B are isometric views of a configurable base frame of the autonomous mobile robot (AMR), according to some embodiments of the present disclosure.

FIG. 1A and FIG. 1B are isometric views illustrating a front portion and a rear portion respectively of the autonomous mobile robot (AMR) 100 for one or more outdoor applications, according to embodiments of the present disclosure. The AMR 100 which is designed with the configurable base frame 500 (as shown in FIG. 5A), the top plate 102, the bottom plate 402 (as shown in FIG. 4), the plurality of drive wheels 112A-D, the plurality of rim 114A-D, the ON/OFF switch 116, the switch protecting cover 118, the plurality of emergency switches 120A-B, the plurality of mud guards 122A-D, the sensor 124, the robot/cobot 126, the end effector 128, and the plurality of suspension units 210A-N (as shown in FIG. 2). In an embodiment, a base frame being configured to obtain the configurable base frame (500) based on one or more parameters. In an embodiment, the one or more parameters corresponds to one or more dimensions associated with the AMR (100) to perform corresponding one or more applications. The configurable base frame 500 of the AMR 100 is designed to be assembled through fasteners (e.g., a bolt, screws, pins etc). In another embodiment, the bolted assembly may be a welded structure. The bolted assembly can be assembled or dismantle very easily. The configurable base frame 500 is enveloped with the one or more side plates 104A-B, the rear plate 106, the one or more corner plates 108A-D, and the front plate 110. The configurable base frame 500 of the AMR 100 is formed by bolting the number of plates i.e. the two side plates 104A-B with the plurality of gearboxes 308A-D (as shown in FIG. 3B) with the plurality of drive motors (310A-D), the rear plate 106, the front plate 110, the bottom plate 402, the top plate 102, and the one or more corner plates 108A-D. In an embodiment, all the plates include various holes for mounting one or more sub-units. In an embodiment, the one or more sub-units may correspond to the plurality of emergency switches 120A-B, the switch protecting cover 118, the plurality of mud guards 122A-D.

The one or more side plates 104A-B are made of a sheet metal with a C shaped cross section. The C shaped includes two horizontal surfaces connected by a vertical surface to improve rigidity of the one or more side plates 104A-B of the configurable base frame 500 (as shown in FIG. 5A). In an embodiment, the one or more side plates 104A-B holds the drive wheel assembly 304 (as shown in FIG. 3B). The drive wheel assembly 304 include a gearbox from the plurality of gearboxes 308A-D (as shown in FIG. 3B) and the plurality of mud guards 122A-D with a drive motor from the plurality of drive motors 310A-D (as shown in FIG. 3B). In an embodiment, one or more clearance holes are provided for mounting the one or more side plates 104A-B to the front plate 110 and the rear plate 106 to form the configurable base frame 500.

In an embodiment, one or more threaded holes are provided at each end to mount the one or more corner plates 108A-D. In an embodiment, one or more inner separation plates are also mounted to the one or more side plates 104A-B. A plurality of standoffs 202A-D (as shown in FIG. 2) and the structural tubing 214 (as shown in FIG. 2) are also mounted on top of the one or more side plate 104A-B. In an embodiment, two identical cutout features are given in part to provide space for the plurality of drive wheels 112A-D to project outside the AMR 100. The two identical cutout features are configured in such a way that the same plate may be used on left and right side i.e., to maintain line of axis for both front and rear wheels. In an embodiment, a drive motor placement is offsetted from the wheel axis such that width of the AMR reduces to bring part reduction and reduced footprint to design.

The front plate 110 is made of a sheet metal with a C cross section which holds the ON/OFF switch 116 and the switch protecting cover 118. In an embodiment, the one or more threaded holes are provided in the front plate 110 for mounting the one or more side plates 104A-B, the one or more corner plates 108A-D, an inner plate and the plurality of standoffs 202A-D. The rear plate 106 is made of sheet metal with a C cross section and configured to perform one or more functions (e.g., load transfer and enclosing one or more components) same as of the front plate 110. In an embodiment, width of a flange 510 (shown in FIG. 5A) of the rear plate 106 is given more than the front plate 110 to provide a base for the robot/cobot 126. A circular plate (not shown in figure) is sandwiched in between the rear plate 106 and the robot/cobot 126 to provide enough strength while mounting the robot/cobot 126. In context of the present disclosure, expressions 'robot' and 'cobot' may be used interchangeably. The one or more corner plates 108A-D is configured to act as a protecting member to cover the AMR 100 fully against water and dust.

FIG. 2 illustrate an isometric view showing one or more inner components of the autonomous mobile robot (AMR), according to some embodiments of the present disclosure. The top plate 102 are connected to the configurable base frame 500 with the plurality of standoffs 202A-D. In an embodiment, a load on top of the AMR 100 is carried by the plurality of standoffs 202A-D. For example, if there is a need to carry load using one or more load carrying apparatus, the plurality of standoffs 202A-D provide a provision for assembling one or more parts on the top of the AMR 100. In an embodiment, the structural tubing 214 corresponds to a structural cross member. The structural cross members are configured to prevent bending of the top plate 102 due to application of the load on top surface of the AMR 100. In an embodiment, by using the structural tubing 214, load carrying capacity is increased without increasing thickness of the top plate 102. In an embodiment, the base frame being configurable, length of the AMR 100 is varied according to one or more applications. For example, if the length of the AMR 100 is to be increased, more structural tubing 214 are added to increase the load carrying capacity of the AMR 100. The top plate 102 serves to protect inner parts of the AMR 100. The top plate 102 also acts as a base platform for carrying payload. In an embodiment, a plurality of covers for cables are placed in the top plate 102. In an embodiment, one or more rubber straps are provided in between one or more top plates for water and dust protection. The battery holding plate 206 which provides protection for the battery 204 acts as a platform for mounting one or more electrical and electronic components and further divides interior of the AMR 100 into two compartments (lower- and upper). In an embodiment, a lower compartment of the AMR holds heavier components like battery, gear boxes, motors wheels to increase the dynamic stability of the system. In an embodiment, an upper compartment of the AMR 100 is used to hold electrical and control system components (e.g., PCBs, SMPS) which are typically lighter weight and more volume.

Figure 3A:
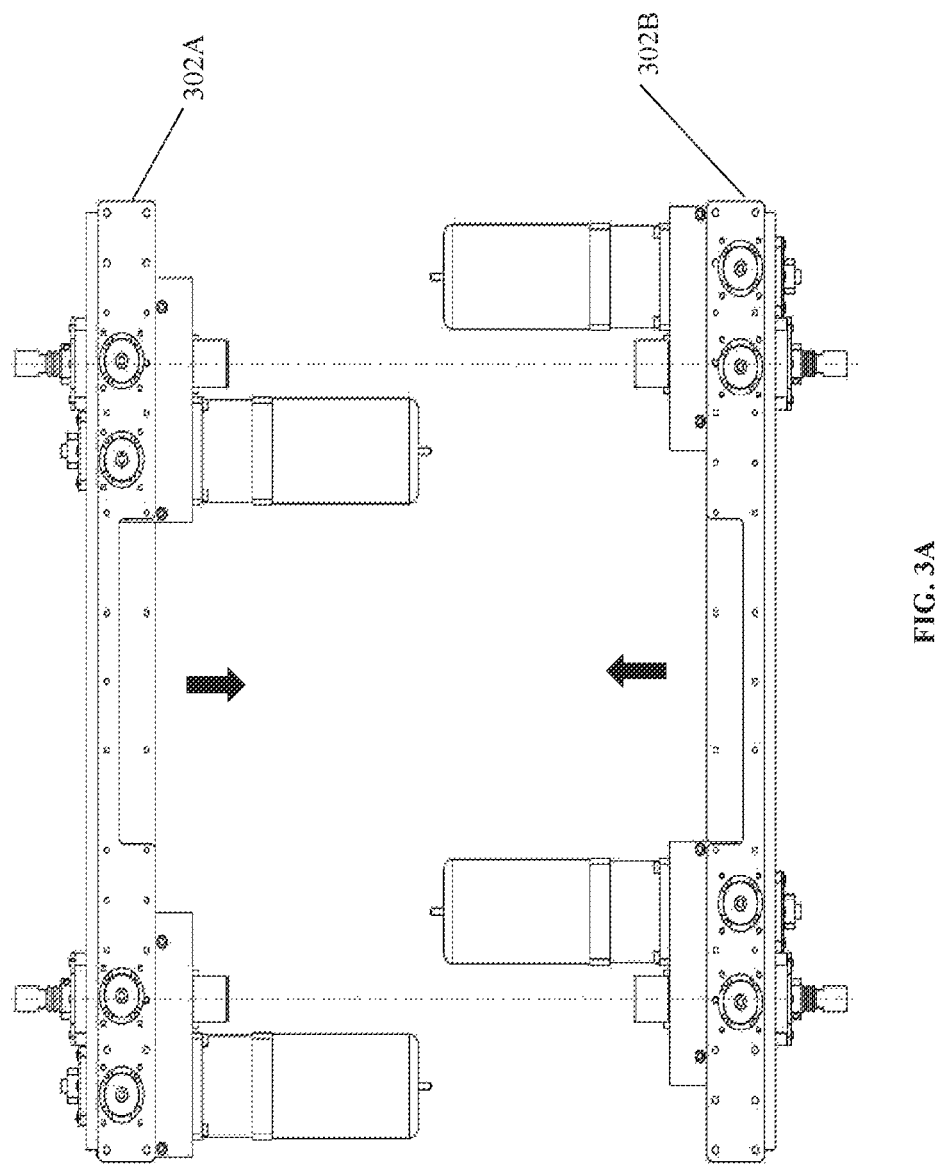
FIG. 3A illustrate a top view of a first drive wheel sub assembly and a second drive wheel sub assembly coupled to form a drive wheel assembly of the autonomous mobile robot (AMR), according to some embodiments of the present disclosure.

FIG. 3A illustrate a top view of the first drive wheel sub assembly 302A and the second drive wheel sub assembly 302B coupled to form the drive wheel assembly 304 of the autonomous mobile robot (AMR) 100, according to some embodiments of the present disclosure. FIG. 3B is a top view of the drive wheel assembly 304 of the autonomous mobile robot (AMR) 100, according to some embodiments of the present disclosure. In an embodiment, a first drive wheel sub assembly (302A), and a second drive wheel assembly (302B) which is additionally re-oriented oppositely to the first drive wheel assembly (302A) to form a drive wheel assembly (304). In an embodiment, the second drive wheel assembly (302B) is identical to the first drive wheel assembly (302A). In an embodiment, the autonomous mobile robot 100 is integrated with the plurality of drive wheels 112A-D driven independently by the plurality of drive motors 310A-D using the plurality of gearboxes 308A-D. In an embodiment, at least one of the drive motor, the gearbox, and the drive wheels are configured to form the first drive wheel sub assembly 302A and the second drive wheel sub assembly 302B and are coupled to form the drive wheel assembly 304. In an embodiment, each of the gearboxes 308A-D support torque multiplication from the drive motor 310A to the plurality of the drive wheels 112A-D. In an embodiment, the plurality of drive wheels 112A-D are also provided with an independent twin suspension system. The independent twin suspension system corresponds to each wheel is configured to independently enable up and down movement to accommodate variability of a ground surface. In an embodiment, each wheel includes two identical suspension units for smooth upward and downward movement. In an embodiment, a design of at least one of (i) the side plate 104A, and (ii) the drive motor 310A, and arrangement of the gearbox 308A are such that same part number of drive wheel assembly can be used on either side of the AMR 100. In an embodiment, the same part number corresponds to same part number in a bill of material. The present embodiment design provide reduced part count in the overall bill of material of the AMR 100 implies less part varieties and less inventory management.

The drive motor 310A along with the gearbox 308A are mounted at two ends of the one or more side plate 104A-B. In an embodiment, connection formed in between the drive motor 310A and the side plate 104A-B is achieved by using a twin linear suspension system. The twin linear suspension system are mounted in between the gearbox 308A and the side plate 104A of the AMR 100 with help of fasteners thus by isolating the drive motor 310A and the side plate 104A-B of the AMR which provides linear motion in between them which corresponds to the drive wheel assembly 304. In an embodiment, each drive wheel of the plurality of drive wheels 112A-D is driven by an individual motor.

FIG. 4 is a bottom view of the autonomous mobile robot (AMR) 100, according to some embodiments of the present disclosure. In an embodiment, bottom side of the AMR 100 is covered by a number of small sheet metal plates instead of covering with a single sheet metal throughout. For example, if the length of the AMR 100 is to be increased, few louver plates are added by reusing the existing louver plates to cover the bottom side. The bottom plate 402 are configured to protect the AMR 100 from water and dust and provide a platform for placing the battery 204. A plurality of louvers 404 are provided in the bottom plate 402 for natural cooling of compartments inside the AMR 100.

Figure 5B:
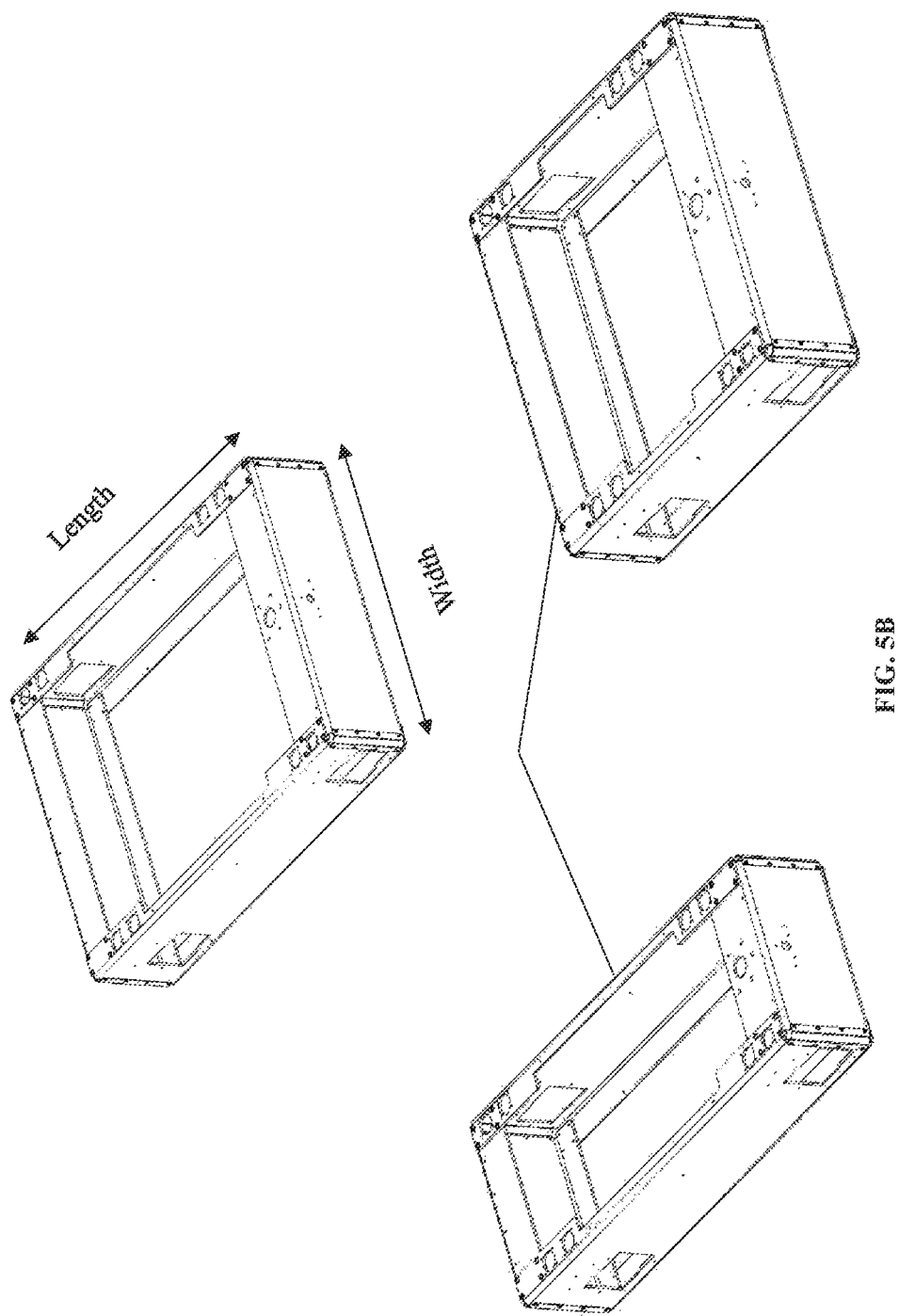

FIGS. 5A and 5B are isometric views of a configurable base frame 500 of the autonomous mobile robot (AMR) 100, according to some embodiments of the present disclosure. In an embodiment, the configurable base frame 500 may alternatively referred as a configurable chassis. The AMR 100 includes cutouts 502 to mount the gear box 308A, a cutout 504 for a power switch and a charging port, holes 506 to mount the robot/cobot 126, and holes 508 to mount the plurality of suspension units 210A-N. The front plate 110 and the rear plate 106 are bolted in between the drive wheel assembly 304 leading the configurable base frame 500 of the AMR 100. The configurable base frame 500 which include a capability to attain varieties of the platform as per required application just by changing the wheel base 406 and the wheel track 408 of the AMR 100. In an embodiment, the configurable base frame 500 can be adjusted height wise.

In an embodiment, on the rear plate 106 of the configurable base frame 500, the flange 510 designed is extended intentionally to provide space for mounting the robot/cobot 126. In an embodiment, the arrangement ensures that the all forces from the robot/cobot 126 are transmitted to the ground through the configurable base frame 500 and the plurality of springs 208A-B. In an embodiment, depending on the base of the AMR 100 or vehicle path of the AMR 100, narrow or wide robot platform is formed by changing very few parts of the base frame of the AMR 100.

In an embodiment, the arrangement holds value where there is a need for both narrow and wide mobile robots for different applications. In an embodiment, narrow mobile robots are more suitable to carry number of loads on a platform and where there is space constrain narrow aisles. In an embodiment, the long and wide mobile robots are more suitable where there is requirement of more stability of the mobile robot platform e.g., a mobile robot with manipulator option. Also, for a smoother skid steer mechanism, the wheel track 408 should be larger than the wheel base 406, i.e. a wide mobile robot.

In an embodiment, the wheel base 406 and the wheel track 408 (FIG. 4) are two important parameters which determine dynamic characteristics associated with skid steer mechanism (e.g., stability during turns with or without payload) of the AMR 100. In an embodiment, by increasing or decreasing the parameters i.e., the wheel base 406 or wheel track 408 or combination thereof which results in significant difference in ride and handling thereby the one or more parameters are specified according to the application of the AMR 100. In an embodiment, the wheel base 406 and the wheel track 408 solely depend on dimensions of the base frame and all other components mounted on the base frame. For example, if the wheel base 406 is modified one side plate and one top plate is replaced and thereby number of bottom plates can be increased. In an embodiment, a length and a width of the AMR (100) corresponds to a wheel track (408) and the wheel base (406) respectively for one or more payload characteristics, and one or more working environmental maneuverability parameters.

Figure 6A:
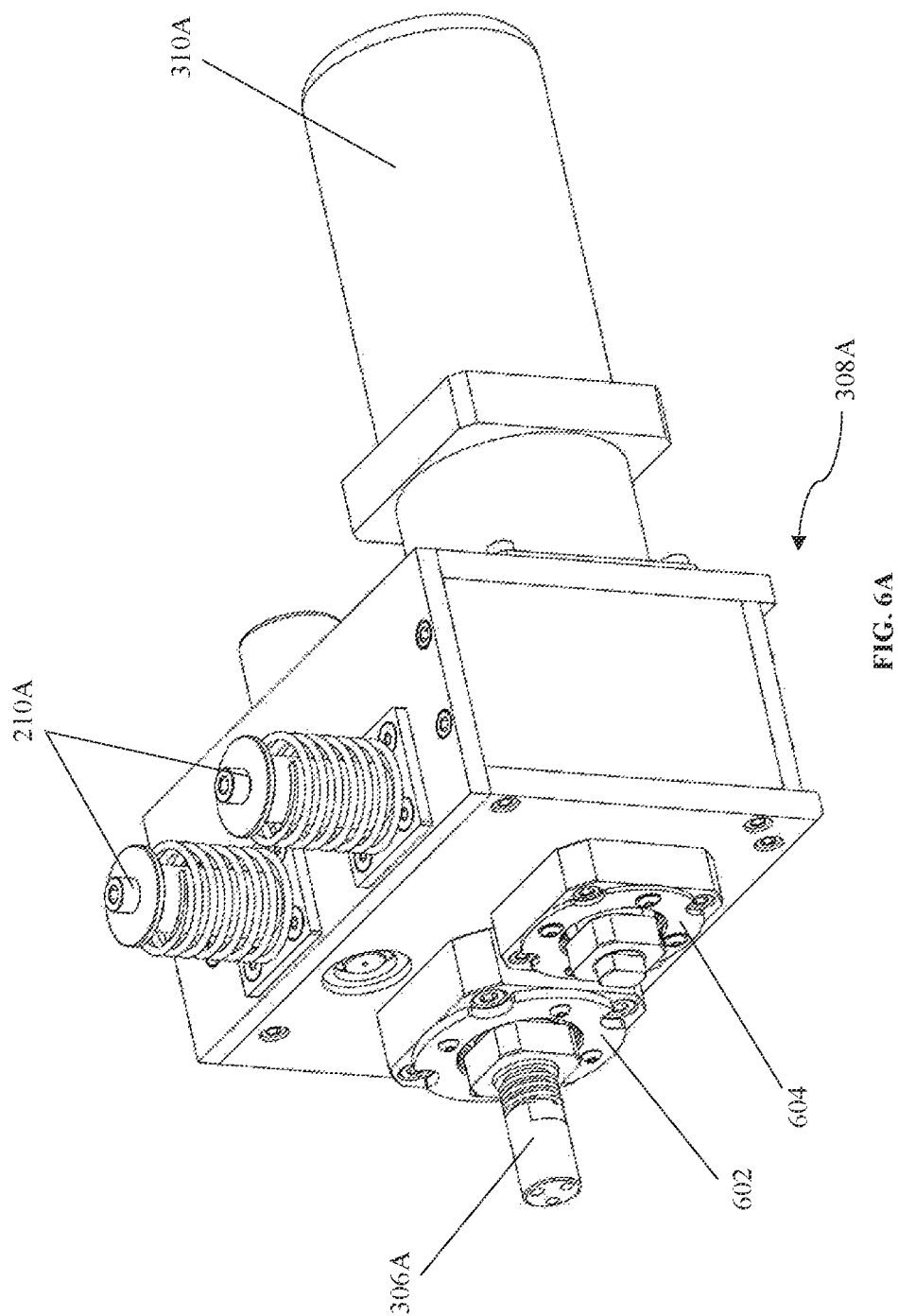
FIG. 6A is an isometric view of the first drive wheel sub assembly of the drive wheel assembly illustrating a gearbox with a drive motor, according to some embodiments of the present disclosure.

With reference to the FIG. 6A, the drive motor of the plurality of drive motors 310A-D and a motor gear shaft 636 is coupled by means of a flexible coupling 634. The flexible coupling 634 is configured to transmit power from the drive motor 310A to the motor gear shaft 636 and provide allowance for small axial and angular misalignments. A drive motor gear 624 is constrained axially by a step feature in the shaft in one side and a spacer in the other side. In an embodiment, a key is provided to integrate the motor gear shaft 636 with a gear.

A bearing unit include two ball bearings 612, the oil seal 606, the spacer 616, the shaft spacer 618, and the bearing cover 614. The two ball bearings 612 are constrained in axial motion using a bearing housing in one side and the spacer 616 and the shaft spacer 618 in other side. The oil seal 606 is provided after the bearing to prevent from dust and moisture and water drops. The bearing cover 614 is mounted to the bearing housing using fasteners which support the oil seal 606 in position and prevent relative axial movement of bearings with respect to the motor gear shaft 636. For example, labyrinth 'V' grooves are provided in the bearing cover for water entry prevention.

In an embodiment, power from the drive motor gear 624 is transmitted to wheel shaft via the wheel shaft gear 622. In an embodiment, axial movement of the wheel shaft gear 622 is constrained by a locknut 608 and by a step feature provided in the wheel shaft. Additional bearing unit 638 is introduced to the drive wheel shaft 306A-D considering offset radial (bending moment) loading caused in the drive wheels.

The axial movement of the ball bearing 612 is constrained using the oil seal 606, the spacer 616, and the shaft spacer 618. The bearing cover 614 also prevent relative axial movement of bearings with respect to the at least one drive wheel shaft 306A, the encoder shaft 630, and the motor gear shaft 636. In an embodiment, groove and bearing cap are provided to prevent rain water leakage into the drive wheel assembly.

The encoder 626 is used inside the drive wheel assembly 304 for monitoring and providing feedback to control motion parameters such as speed, rate, direction, distance or position. The encoder 626 is mounted to inside of side plate of the drive wheel assembly 304 using one or more screws. The encoder 626 and an encoder shaft 630 are coupled using the flexible coupling 634 in similar way as in the motor gear shaft 636. The bearing unit is added to provide support to an encoder shaft gear 628.

Figure 7A:
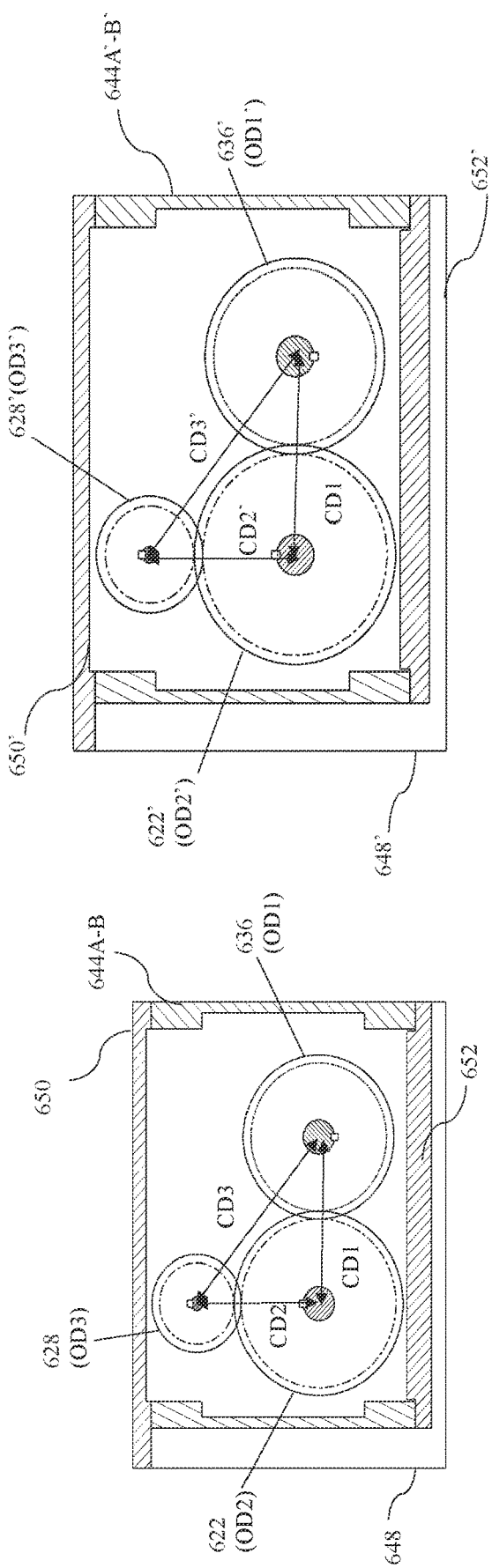
FIG. 7A is an exemplary sectional view of the gearbox of the autonomous mobile robot (AMR), according to some embodiments of the present disclosure.

FIG. 6A is an isometric view of the first drive wheel sub assembly 302A of the drive wheel assembly 304 illustrating the gearbox 308A with the drive motor 310A, according to some embodiments of the present disclosure. The gearbox 308A includes a front plate 646, a rear plate 648, a side plate 644A-B, a bottom plate 652, and a top plate 650. The top plate 102 and the bottom plate 402 are provided with one or more threaded holes and remaining plates are provided with at least one clearance hole through which one or more fasteners are screwed to form the gearbox 308A. In an embodiment, on the front plate 110 i.e. a wheel side, one or more bearing units are mounted i.e. one is for a wheel shaft and another is for the motor gear shaft 636, and on the rear plate 106 an additional bearing for the drive wheel shaft 638, the encoder 626 and the drive motor 310A is mounted. In an embodiment, on the top plate 102, the suspension unit 210A are mounted. The gearbox 308A is configurable according to power transmission requirement. In one embodiment, there can be a demand for an alternate speed of the AMR 100, an alternate torque and combination thereof. The new torque or the new speed is achieved based on a different gear ratio and a different motor. In an embodiment, change in gear ratio corresponds to change in the components such as the wheel shaft gear 622, the drive motor gear 624, and the encoder shaft gear 642. The three gears are configured to attain change in outer diameter (OD) as indicated in FIG. 7A.

In an embodiment, the plurality of gearboxes 308A-D is configured to as a plurality of configurable gearboxes for obtaining different drive power of the drive wheel assembly 304 by at least changing one of (i) one or more dimensions of a plurality of gearbox plates, (ii) one or more ratio of a wheel shaft gear 622 and a motor gear shaft 636, and (iii) one or more specification associated with the plurality of drive motors 310A-D.

Figure 6B:
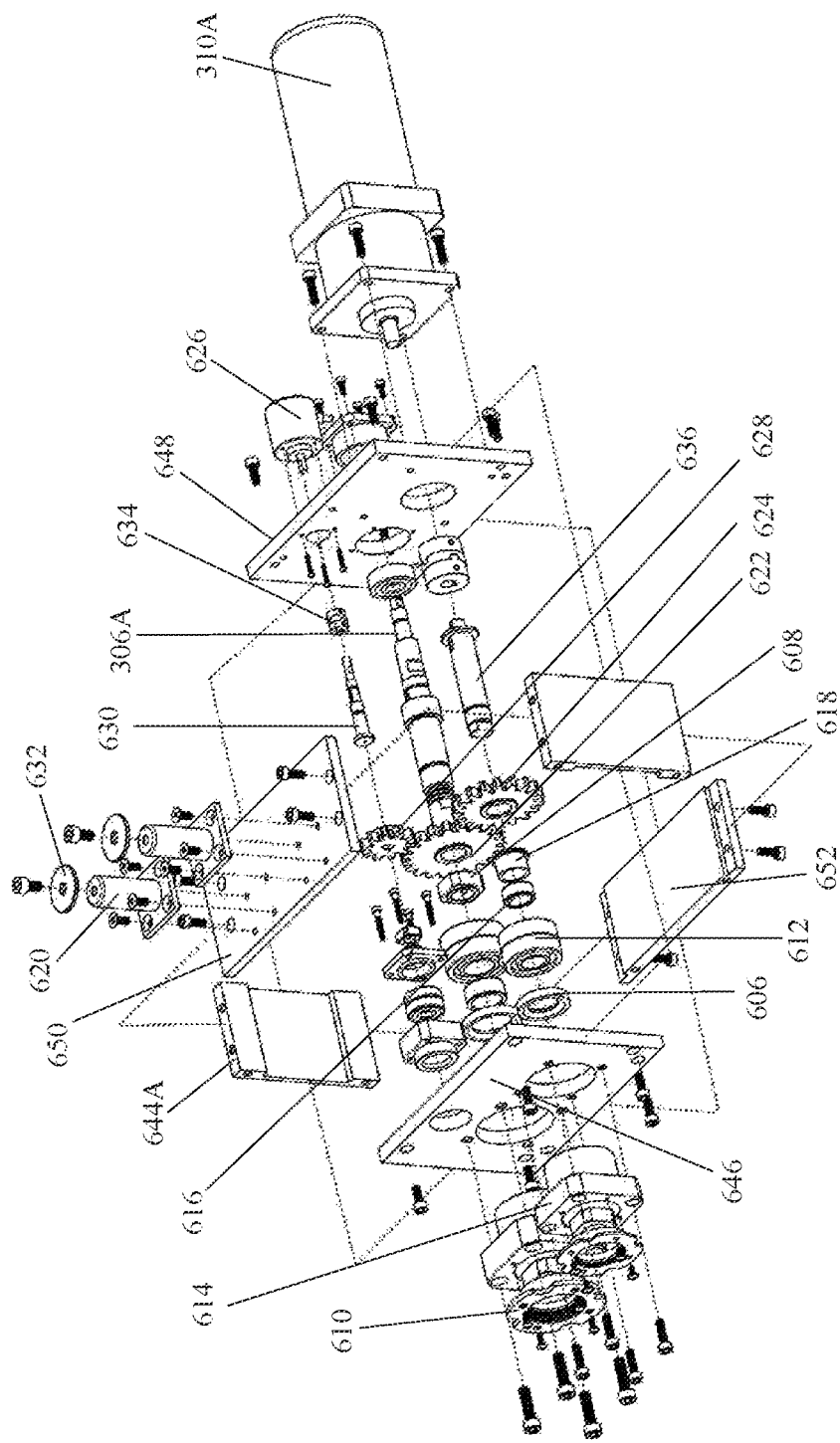
FIG. 6B is an exploded view of the gearbox with the drive motor, according to some embodiments of the present disclosure.

FIG. 6B is an exploded view of the gearbox 308A with the drive motor 310A, according to some embodiments of the present disclosure. In an embodiment, additional bearing unit is introduced to the wheel shaft considering impacts of various load on the shaft from the wheel during motion. In an embodiment, due to presence of the two bearing units, the wheel shaft can take bending load, radial load, as well as axial load. The bearing housing is mounted to the rear plate of the gearbox 648 using one or more fasteners. The axial movement of the ball bearing 612 is constrained using the spacer 616 and the locknut 608 on both sides. In an embodiment, at wheel side shaft is provided with the step features 640 which helps in preventing water entry into the bearing unit. The bearing cover 614 is configured to prevent relative axial movement of bearings with respect to the shaft. The grooves and bearing caps are provided to prevent rain water leakage into the drive wheel assembly.

The gearbox 308A includes two main shafts i.e. the motor gear shaft 636 and wheel shaft coupled in between the drive motor and the drive wheel through the drive motor gear 624 and the wheel shaft gear 622, and are covered by gearbox plates and also supported at ends by bearing units for smooth functioning and friction reduction in the power transmission line. In an embodiment, lubrication of the bearing units for smooth functioning of the gearbox 308A and the drive wheel assembly.

In an embodiment, high torque motors are expensive and may be large in size and space required to mount the motor is more so that the drive motor used here is low torque motor whereas required high torque multiplication for the vehicle is achieved by the gearbox 308A.

The gearbox 308A also provided with the encoder 626 which is configured to send continuous feedback so that the vehicle can read corresponding position, speed and direction. In an embodiment, the feedback is received from the wheel shaft. The wheel shaft and encoder shafts are connected with the encoder shaft gear 628 and the drive motor gear. The encoder shaft is connected in between bearing unit at one end and coupled by the flexible coupling 634 at another end. The extended (cantilevered) encoder shaft experiences some bending loads which is taken care by the bearing unit.

FIG. 7A is an exemplary sectional view of the gearbox 308A of the autonomous mobile robot (AMR) 100, according to some embodiments of the present disclosure. In an embodiment, when the diameters change, which corresponds to the change in center distance (CD) between the three gears. In an embodiment, the change in dimension for at least one of gearbox outer plates results in change in dimension i.e. length and width of the front plate of the gearbox 646. Further, the length of configured side plate of the gearbox 644A'-B' and length of the top plate of the gearbox 650, and length of the bottom plate of the gearbox 652 is changed. In an embodiment, one or more plates scale up or scale down in dimensions i.e. length and width which results in sufficient clearance of the inner walls of the gearbox with the outer diameters of the gears.

FIG. 7B is an exploded view of plurality of configurable components of the gearbox 308A illustrated in FIG. 6B of the autonomous mobile robot (AMR) 100, according to some embodiments of the present disclosure. In another embodiment, the change in motor itself for change in power with or without gear ratios. In this case, the rear plate, or the front plate and combination thereof is re-configurable to mount another drive motor. In an embodiment, the motor gear shaft 636 are same and only the flexible coupling 634 are new corresponding to a coupling mounting diameter of the motor shaft. In an embodiment, the configurable gearbox, includes one or more configurable components i.e., the wheel shaft gear 622, the drive motor gear 624, the encoder shaft gear 642, and the side plate 644A-B, the front plate of the gearbox 646, the rear plate of the gearbox 648, the top plate of the gearbox 650, the bottom plate of the gearbox 652, and the drive motors 220A.

Figure 8:
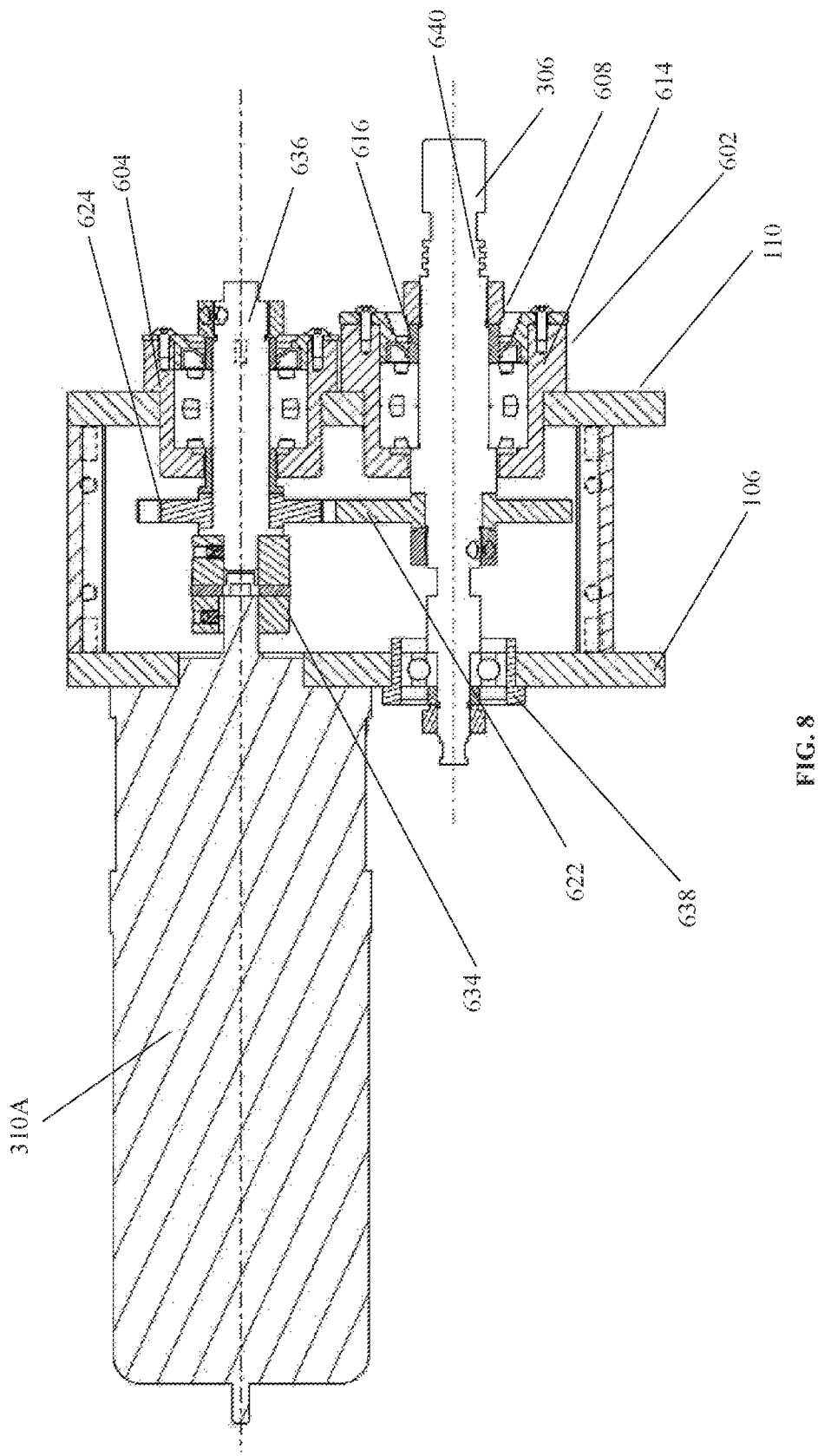
FIG. 8 is an exemplary view illustrating a power transmission from the drive motor to a drive wheel shaft of the autonomous mobile robot (AMR), according to some embodiments of the present disclosure.

FIG. 8 is an exemplary view illustrating a power transmission from the drive motor 310A to the drive wheel shafts 306A-D of the autonomous mobile robot (AMR) 100, according to some embodiments of the present disclosure. A power is transmitted from the drive motor to the wheel through the gearbox. The motor gear shaft 636 is supported by the bearing unit at one end and coupled at another end. The motor gear shaft 636 and the drive motor 310A is connected with the flexible coupling 634 whereas the drive motor gear (driver) 624 is mounted on the motor gear shaft 636. The wheel shaft gear (driven) 622 is mounted on wheel shaft and the wheel shaft gear 622 is mating with driver gear which receives power from the drive motor gear (driver) 624 and transfers to the wheel and provides essential torque. In an embodiment, the wheel shaft is mounted in between the two bearing units to take the axial load and radial load.

Figure 9:
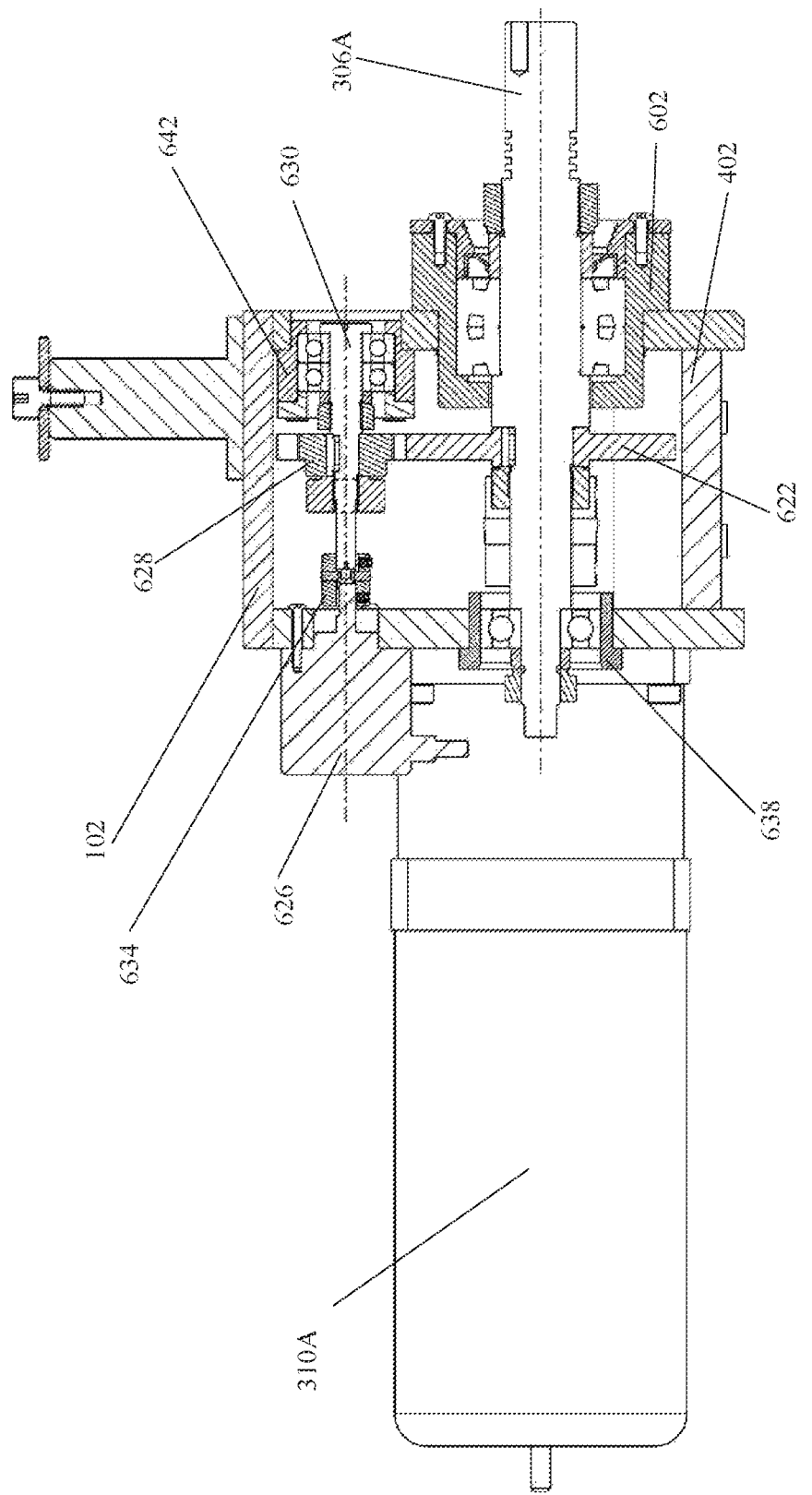
FIG. 9 is an exemplary view illustrating a velocity feedback through power transmission from the drive wheel shaft to an encoder shaft of the autonomous mobile robot (AMR), according to some embodiments of the present disclosure.

FIG. 9 is an exemplary view illustrating a velocity feedback through power transmission from the drive wheel shafts 306A-D to the encoder shaft 630 of the autonomous mobile robot (AMR) 100, according to some embodiments of the present disclosure. The encoder 626 is coupled to the encoder shaft. The encoder shaft 630 include gear mounted which is driven by the wheel shaft gear (driven) 622. The encoder 626 used is here is to control the drive motor 310A which further controls accurate position of the robot. The position controlling is performed by getting angular position of the shaft. In an embodiment, the encoder 626 used here is a rotary encoder which receives the input from the wheel shaft gear (driven) 622 and transmits to the drive motor 310A to control position of the mobile robot accurately.

Figure 10:
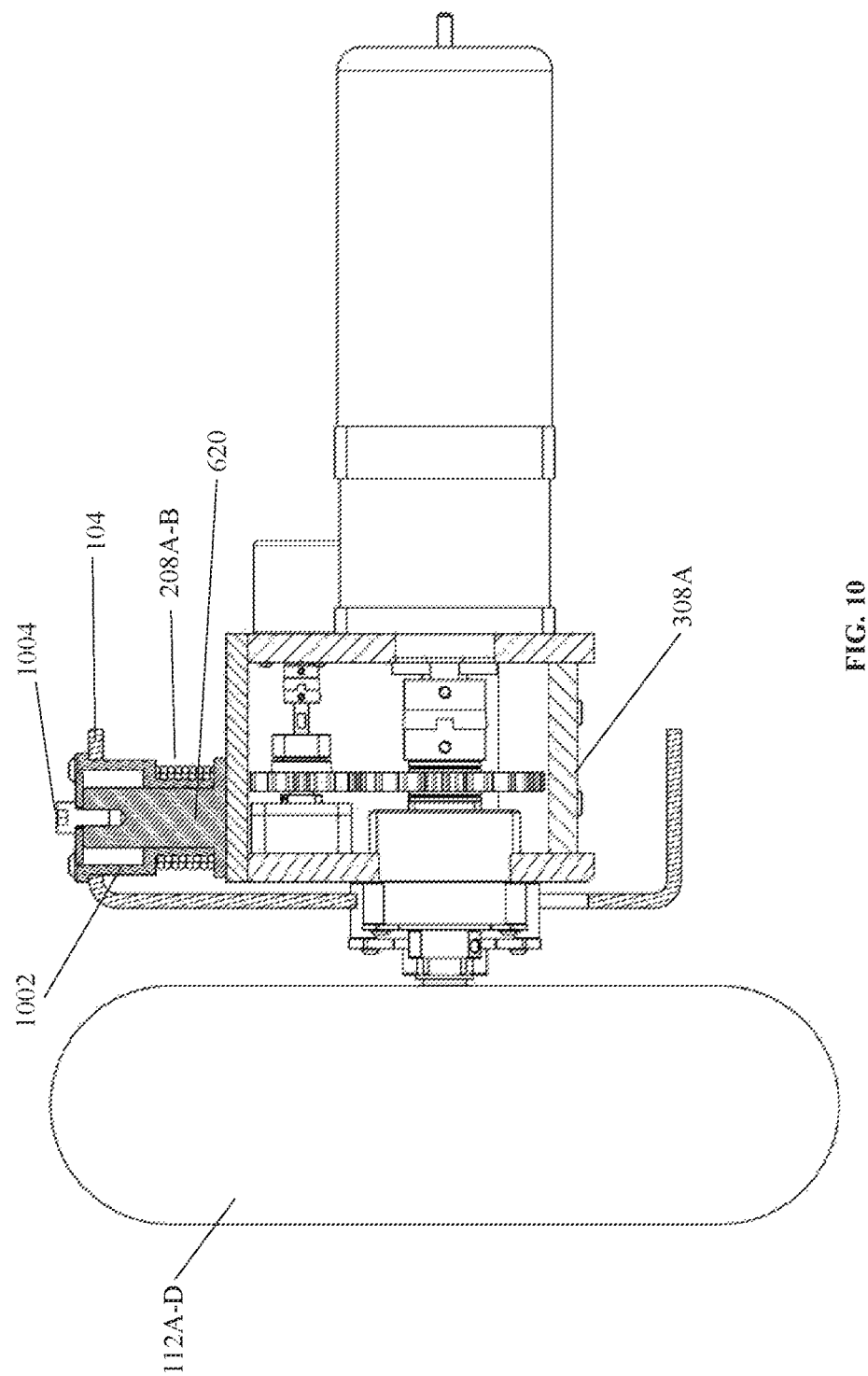
FIG. 10 is a sectional view of a plurality of suspension units of the autonomous mobile robot (AMR), according to some embodiments of the present disclosure.

FIG. 10 is a sectional view of the plurality of suspension units 210A-N of the autonomous mobile robot (AMR) 100, according to some embodiments of the present disclosure. In an embodiment, independent suspension is provided in the two-drive wheel sub-assemblies 302A-302B. The drive wheel assembly 304 is attached to the configurable base frame 500 through suspension systems. In an embodiment, each suspension system includes two linear sliding bearing units along with two coil springs 208A-B. The linear bearing 620 is directly mounted to the top plate 102 of the drive wheel assembly 304 using the one or more fasteners. In an embodiment, the linear bearing 620 is configured to slide inside a bearing enclosure. The bearing enclosure is rigidly connected to the one or more side plates 104A-B of the configurable base frame 500 using one or more fasteners. In an embodiment, the plurality of suspension units (210A-N) is configured by the one or more side plates (104-B) of the configurable base frame (500) and the plurality of gearboxes (308A-D) to provide an independent suspension to the AMR (100). The coil springs 208A-B are introduced in between base of linear bearing and bottom portion of the bearing enclosure. For example, when the AMR 100 is traversing through a plane with no floor disturbances, the AMR body including the load hang on the spring by spring force. In an embodiment, whenever there is an external force acting on the wheels vertically, due to a difference in floor height or small obstacles, wheels assembly lift upward or downward to keep the wheels always in the floor and thereby providing enough traction to drive the AMR 100.

Figure 11:
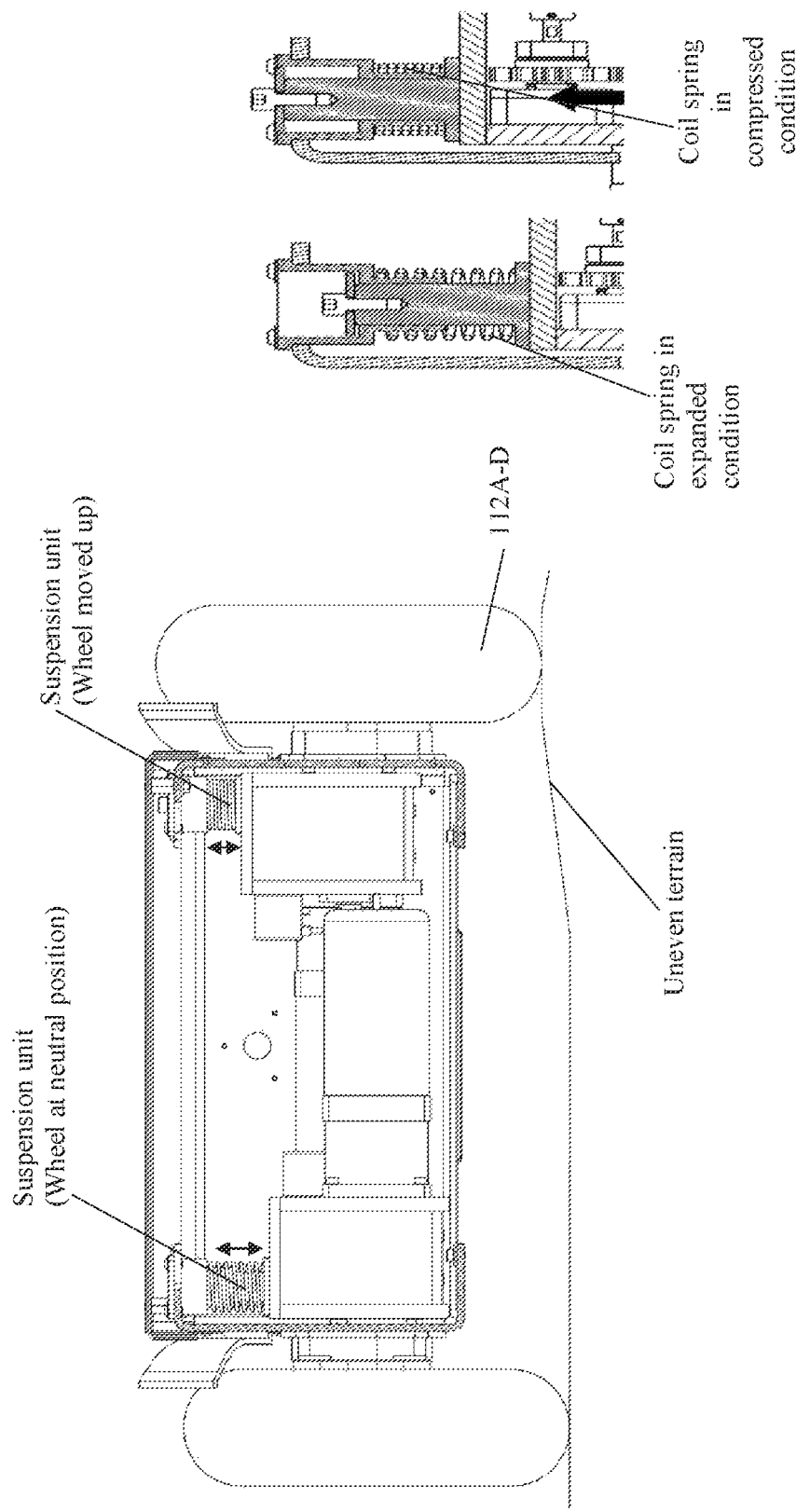
FIG. 11 is an exemplary cross section view of the autonomous mobile robot (AMR) illustrating a working mechanism of the plurality of suspension units in an outdoor environment, according to some embodiments of the present disclosure.

FIG. 11 is an exemplary cross section view of the autonomous mobile robot (AMR) 100 illustrating a working mechanism of the plurality of suspension units 210A-N in an outdoor environment, according to some embodiments of the present disclosure. In an embodiment, the suspension system used is a twin linear suspension system. Two sets of linear bearings with the two sets of coil springs 208A-B, the two sets of spring housings 1002 and with the suspension stroke restrictor 632 which forms the twin linear suspension system. The twin linear suspension system makes the AMR 100 compact without compromising suspension effect. The outer diameter of the linear bearing 620 and inner diameter of the spring housing 1002 have cylindrical bearing contact provide a sliding motion. In an embodiment, in the spring-based suspension system, the coil spring 208A-B can be replaced as a hydraulic damper. The hydraulic dampers are more suitable for high speed vehicle. In the AMR 100 a twin cylinder suspension system with the linear bearing 620 is enough since the AMR 100 runs at slow speed as compared to high speed vehicle.

The payload acts on top of the vehicle and load gets transferred to the ground through one or more components of the AMR. The load transfer is enabled from the top plate 102 to the base frame through the plurality of stand offs. In an embodiment, the load is evenly distributed between the pluralities of standoffs. The evenly distributed load across the base frame is converged and passes through suspension units towards the gearbox. Further, the load transfer is enabled from the gearbox body passes though the two bearing units of the wheel shaft to the wheel shaft. Further the load from the wheel shaft is passed on to the ground through the plurality of drive wheels 112A-D.

The embodiments of present disclosure in which depending on the industry space constraints/load requirements of the application more variants of the vehicle in terms of vehicle height/width/length can be done by minimal changes to few parts. The AMR have a capability to operate on own program of automatic navigation system with aid of one or more sensors which acquire information to extract meaningful environmental features giving assistance for obstacle detection and path planning. The embodiments of present disclosure in which depending on working requirements the present disclosure provide an option to change the platform by changing very few parts.

The AMR comes in aspect of providing required functionalities with compactness and adaptability for future modifications. In an absence of the chassis, the base frame structure formed of plurality of sheet metal plates provide ample strength and rigidity to the system. Design of the plurality of sheet metal plates are done in a way such that part variety is less. The drive wheel assembly which provides an interchangeability of gears for speed or torque multiplication according to the system demands for a particular application. Interiors of the AMR is divided into two sections with thin sheet metal plates. The heavier parts like the drive wheel assembly and the battery are arranged in bottom section whereas lighter parts like electrical and electronic components arranged in top section. The louvers are provided in the bottom plates to provide natural cooling inside the motor chamber of the AMR. Independent suspensions are provided near the plurality of drive wheels. The suspension unit and wheel together provide smooth traversing of the AMR in terrains which are irregular than an industrial workspace.

As the configurable base frame is now a bolted structure, left and right-side assembly can be separately assembled. The bolted assembly provide easiness in changing any part if found defective. The AMR is configured with a same plate in left and right side to reduce a part variety and cost. The front plate contributes for rigidity in the configurable base frame.

The outer plates (protection members) carries weight and provide rigidity so that a separate chassis is not required for the AMR which reduces the weight considerably. The gearbox design which serves purpose of speed/torque multiplication. Gearbox arrangement is in such a way that width of the vehicle is minimum which supports the vehicle to travel through narrow paths. Louvers are provided in the bottom plates to provide natural cooling inside the vehicle chamber. Rubberized tires are used in the AMR to work in outdoor conditions. There is provision to install alternate tires according to the field of application.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. An autonomous mobile robot (AMR), comprising:
a base frame configured based on one or more parameters, wherein
 the one or more parameters corresponds to one or more dimensions associated with the AMR,
 the base frame includes a top plate, a bottom plate, one or more side plates, a rear plate, one or more corner plates, and a front plate,
 the one or more side plates includes a top portion,
 the top portion includes a plurality of standoffs and a structural tubing, and
 the top plate is connected to the base frame with the plurality of standoffs,
 the rear plate comprises an ON/OFF switch and a switch protecting cover,
 the ON/OFF switch is enclosed within the switch protecting cover;
a sensor on the top plate of the base frame;
a battery holding plate configured to provide a platform for mounting one or more electrical and electronic components, wherein the battery holding plate is configured to divide an interior of the AMR into two compartments;
a drive wheel assembly that includes a first drive wheel assembly and a second drive wheel assembly, wherein
 the second drive wheel assembly is opposite to the first drive wheel assembly, and
 the second drive wheel assembly is identical to the first drive wheel assembly;
a first flange on the front plate and a second flange on the rear plate, wherein
 the first flange has a first width and the second flange has a second width,
 the first width of the first flange is smaller than the second width of the second flange;
a plurality of drive motors;
a plurality of gearboxes that includes a plurality of gearbox plates, wherein
 a plurality of suspension units are adapted to the one or more side plates of the base frame and the plurality of gearboxes,
 the plurality of gearboxes are is configured to obtain varying drive power for the first drive wheel assembly and the second drive wheel assembly, wherein the varying drive power is based on a ratio of a wheel shaft gear and a motor gear shaft;
 the plurality of suspension units comprises:
  two sets of linear bearings with two sets of coil springs,
  two sets of spring housings, and
  at least one suspension stroke restrictor,
  wherein the two sets of linear bearings with the two sets of coil springs, the two sets of spring housings, and the at least one suspension stroke restrictor forms an independent twin linear suspension system,
  wherein an outer diameter of at least one linear bearing among the two sets of linear bearings and an inner diameter of at least one spring housing among the two sets of spring housings form a cylindrical sliding bearing contact component,
  wherein the twin linear suspension system facilitates a connection between a drive motor of the plurality of drive motors and the one or more side plates, wherein the twin linear suspension system is mounted in between a gearbox of the plurality of gearboxes and the one or more side plates thereby separating the drive motor from the one or more side plates, and wherein each drive wheel of a plurality of drive wheels associated with the drive wheel assembly is driven by a respective individual drive motor of the plurality of drive motors,
  wherein the plurality of suspension units are configured to independently enables up and down movement of the AMR to accommodate variability of a ground surface;
a bearing unit that includes two ball bearings, an oil seal, a spacer, a shaft spacer, and a bearing cover, wherein and
 relative axial movement of the two ball bearings with respect to the motor gear shaft is constrained using the oil seal, the spacer, the shaft spacer, and the bearing cover; and
an encoder and an encoder shaft coupled to one another by a flexible coupling, wherein the encoder is configured to monitors and provides feedback to control motion parameters of the AMR including one or more of speed, acceleration, direction, distance, or position.

2. The AMR as claimed in claim 1, wherein the base frame is configured to be assembled and disassembled using a plurality of fasteners.

3. The AMR as claimed in claim 1, wherein
the AMR has a length and a width,
the length and the width of the AMR corresponds to a wheel track and a wheel base determined based on one or more payload characteristics and one or more working environmental maneuverability parameters.

4. The AMR as claimed in claim 1, further comprising:
an extendable robotic arm provided on the second flange, wherein
 the extendable robotic arm includes an end effector, and
 a force from the extendable robotic arm is configured to be transmitted to the base frame.

5. The AMR as claimed in claim 1, wherein the front plate and the rear plate are secured between the first drive wheel assembly and the second drive wheel assembly.

6. The AMR as claimed in claim 1, wherein the one or more corner plates are configured to connect the one or more side plates to the front plate and the rear plate to fill one or more gaps thereby preventing one or more external particles from entering the AMR.

7. The AMR as claimed in claim 1, wherein the plurality of gearbox plates of the plurality of gearboxes comprises one or more gearbox side plates, a gearbox front plate, a gearbox rear plate, a gearbox top plate, and a gearbox bottom plate.

8. The AMR as claimed in claim 7, wherein a length and a width of the one or more gearbox side plates, the gearbox front plate, the gearbox rear plate, the gearbox top plate, and the gearbox bottom plate are configurable based on a power transmission requirement.

9. The AMR as claimed in claim 1, wherein the plurality of gearboxes and each of the first drive wheel assembly and the second drive wheel assembly are configured to move the AMR in an upward direction or a downward direction.

10. The AMR as claimed in claim 7, wherein
each of the one or more gearbox side plates, the gearbox front plate, the gearbox rear plate, the gearbox top plate, and the gearbox bottom plate are provided with a plurality of holes through which a plurality of fasteners are secured.

11. The AMR as claimed in claim 1, wherein the base frame is configured to distribute and transmit a load from the top plate to one or more drive wheels of the plurality of drive wheels.

12. The AMR as claimed in claim 1, wherein each of the first drive wheel assembly and the second drive wheel assembly comprises two drive motors of the plurality of drive motors and two gearboxes of the plurality of gearboxes.

13. The AMR as claimed in claim 1, wherein each of the top plate, the bottom plate, the one or more side plates, the rear plate, the one or more corner plates, and the front plate includes a plurality of holes.

14. The AMR as claimed in claim 1, wherein
the one or more side plates are formed by a section of a sheet metal with a C-shaped cross-section, the C-shaped cross-section including two horizontal surfaces connected by a vertical surface.

15. The AMR as claimed in claim 1, further comprising:
a plurality of louvers provided on the bottom plate, wherein the plurality of louvers are configured to provide cooling airflow to the two compartments inside the AMR; and
a plurality of cutouts provided on the one or more side plates, wherein the plurality of cutouts are configured for mounting to the plurality of gearboxes, and providing a charging port.

* * * * *